US005794257A

United States Patent [19]

Liu et al.

[11] Patent Number: 5,794,257

[45] Date of Patent: Aug. 11, 1998

[54] AUTOMATIC HYPERLINKING ON MULTIMEDIA BY COMPILING LINK SPECIFICATIONS

[75] Inventors: Peiya Liu, East Brunswick, N.J.; Kenneth Hampel, Yardley, Pa.; Arding Hsu, Kendall Park, N.J.

[73] Assignee: Siemens Corporate Research, Inc., Princeton, N.J.

[21] Appl. No.: 503,074

[22] Filed: Jul. 14, 1995

[51] Int. Cl.$^{6}$ .......... G06F 17/30

[52] U.S. Cl. .......... 707/501

[58] Field of Search .......... 395/762, 774, 395/356, 357, 613–615; 707/501, 513, 102–104; 345/356, 357

[56] References Cited

U.S. PATENT DOCUMENTS

| | | | |
|---|---|---|---|
| 5,297,249 | 3/1994 | Bernstein et al. | 395/356 |
| 5,404,534 | 4/1995 | Foss et al. | 395/683 |
| 5,430,872 | 7/1995 | Dahod et al. | 395/615 |
| 5,537,546 | 7/1996 | Sauter | 395/200.01 |
| 5,557,722 | 9/1996 | DeRose et al. | 395/774 |
| 5,603,025 | 2/1997 | Tabb et al. | 395/602 |
| 5,608,900 | 3/1997 | Dockter et al. | 395/613 |
| 5,623,679 | 4/1997 | Rivette et al. | 395/773 |
| 5,634,062 | 5/1997 | Shimizu et al. | 707/501 |

*Primary Examiner*—Joseph R. Burwell
*Attorney, Agent, or Firm*—Donald B. Paschburg

[57] ABSTRACT

A link specification and an electronic manual is provided to an auto linker which in conjunction with a run-time media engine provides hyperlinked manuals. The auto linker comprises a link generator for generating links and a link verifier for checking and modifying the links that are generated. The run-time media engine comprises an event handler and a script interpreter and handles the user interaction. Through the interaction of the hyperlinks from the auto linker with the run-time media engine the hyperlinked manuals are produced.

10 Claims, 4 Drawing Sheets

AUTOMATIC HYPERLINKING ON MULTIMEDIA BY COMPILING LINK SPECIFICATIONS

FIELD OF THE INVENTION

The present invention relates to the creation of hyperlinked multimedia and more particularly to automatic hyperlinked technology based on formal specifications.

DESCRIPTION OF THE PRIOR ART

Most approaches to automatic link generation are for pre-fixed structural links (e.g. hypertext table-of-contents) and index links on text-oriented documents. The more advanced systems are based on content representation of text nodes as a vector derived from the terms in node content. Automatic link generation is formalized as measuring vector similarity among nodes. Even for text documents, the main disadvantage to these systems is that users have no control over the link generation procedure. These systems cannot adapt to different usages of links for information access and to different media.

The Hypermedia Template method developed at the IRIS Institute uses templates to help users generate links. Templates are sets of pre-linked documents. The method provides incremental improvements to manually coded linking methods. SmarText by Lotus-Big Science is a system that is used to generate hypertext tables of contents, automated keyword index generation, and cross reference link generation based on keywords and paragraph analysis. HyperTRANS by Texas Instrument is a system that translates the input documents into nodes. Links among the nodes are automatically generated based on references to: chapters, figures, etc. HieNet by Passage Systems, Inc. is a user-centered approach to link generation based on Link Profiles. Similarity measures are used to link relevant information. HYTEA by the Esprit project has produced a Hypermedia Design Model. This model supports automatic derivation of structural and perspective links based on the structure of the model. It is a text-oriented method and has limitations in generating application-specific links which are required for accessing information in documents.

SUMMARY OF THE INVENTION

The present invention is an automatic hyperlinking system based on formal specifications to describe the patterns of the "source" and "destination" points of connections for hotspots and links. When "source" and "destination" points are connected with hyperlinks, access to the connected information is facilitated. Generally, a mouse is used to click on a hotspot ("source") to provide instant access to the "destination" by following the link. By compiling hotspot and link specifications, hyperlinks can be generated automatically for multimedia data in a uniform and consistent manner.

This technology can be utilized to create hyperlinked multimedia manuals which can provide efficient information access. The electronic manuals and the link specification are inputted into an auto linker which includes a link generator, a link verifier and a hyperlink buffer. The link generator provides the links and the link verifier is used to check and modify the links. The output of the auto linker are hyperlinks. A run time media engine comprising an event handler and a script interpreter is utilized to handle user interaction. At run-time, the media engine responds to the mouse clicks on hotspot areas in the hyperlinked manuals. Through the interaction of the hyperlinks from the auto linker and the run time media engine, the hyperlinked manuals are produced.

The link specification described by the specification language compiled by the link generator can UNIFORMLY describe the needed hyperlinks on different content-type media for required information access. The present invention can systematically generate the hyperlinks once the needed hyperlinks are adequately specified. The mechanism to INCREMENTALLY specify Anchorable Information Units (AIUs) on non-textual media using <STRING . . . >, <TAG . . . >, AND <CONTEXT . . . > is particularly useful because there is no general solution to identifying objects in non-textual media, and thus there are no standard ways to represent AIUs for non-textual media. Without recoding Linker Generator, the present invention provides a solution to specify/generate AIUs on a variety of media and formats in an extensive manner based on the best identification programs that are available.

DETAILED DESCRIPTION OF THE INVENTION

Figure 1:
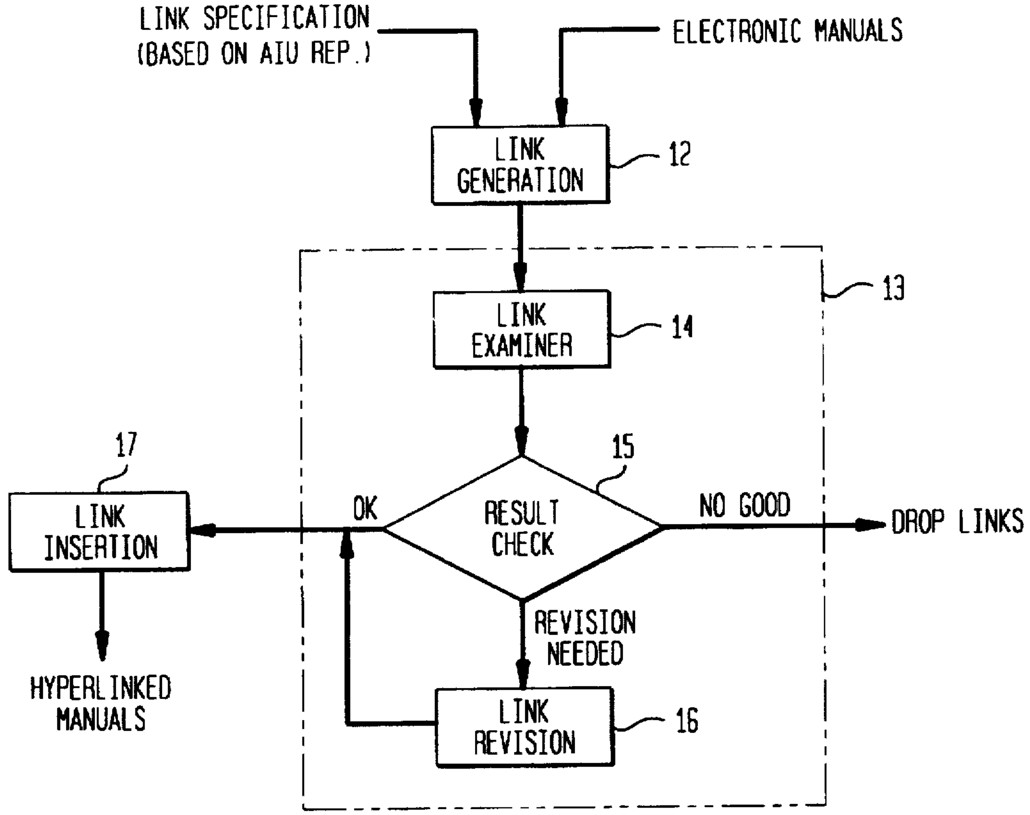
FIG. 1 illustrates a high level description of the present invention.

FIG. 1 illustrates a hyperlinked manual creation process of one embodiment of the present invention. A link generator 12 takes the electronic manuals and a link specification as inputs and provides links as an output. The link specification is described by the specification language compiled by the link generator 12. A link verifier 13 is used to check and modify the links that are generated. Within the link verifier 13, a link examiner 14 generates a profile for examining the links generated by the link generator 12. A decision block 15 is connected to the output of the link examiner 14 to check the results. At the decision block 15 several decisions are made. If the links are no good, the links are dropped. If the links need revision, the links go through a link revisor 16 and are passed on to a link inserter 17. If the links are acceptable, the links go directly from the decision block 15 to the link inserter 17. The output of the link inserter 17 are hyperlinked manuals.

Figure 2:
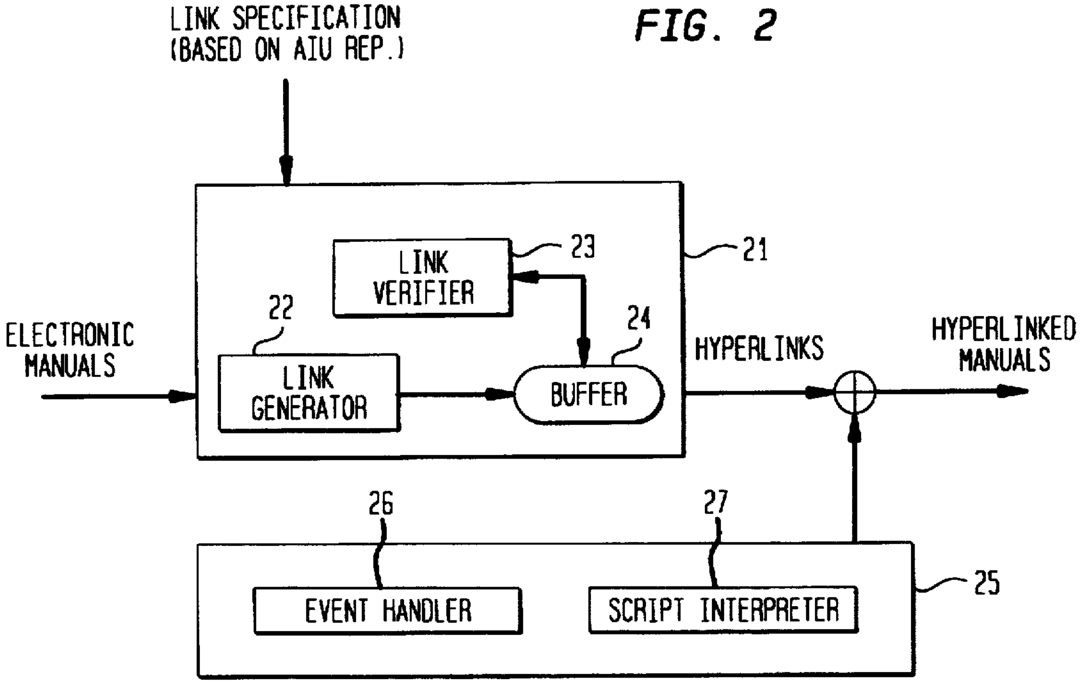
FIG. 2 illustrates the architecture for creating hyperlinked service manuals.

FIG. 2 illustrates the system architecture of one embodiment of the present invention for creating hyperlinked service manuals. An auto linker 21 accepts the electronic manuals and the link specification as inputs and provides hyperlinks as an output. Within the auto linker 21 are a link generator 22, a link verifier 23, and a hyperlink buffer 24. As described above, the link generator 22 provides the links and the link verifier 23 is used to check and modify the links that are generated. The hyperlink buffer 24 correlates the link verifier 23 and the link generator 22. The output of the auto linker 21 are hyperlinks. A standard run time media engine 25, as is known in the art, is now required to handle user interaction. A media engine is a run-time link interpreter which interprets the hyperlinks and performs proper actions according to their meaning whenever users click the computer mouse on the hyperlinks in the manuals. In other words, a media engine responds appropriately to mouse clicks on the hotspot areas in the hyperlinked manuals. For example, an action could be turning the manual to related pages from one place in the manual. A media engine 25 often consists of an event handler (a mechanism responds to window events) 26 and a script interpreter (a program executes those events) 27.

There are three types of individuals involved with the present invention: the developer, the builder and the user. The developer provides the autolinker. The builders provide the link specification with the original manuals and use the autolinker to create hyperlinked multimedia manuals. A human "builder" must possess some knowledge about the manuals. The builder uses the specification language of the present invention to specify hotspots and links. The specification language allows the use of patterns and variables. Many links can be automatically created from a single specification. Through the interaction of the hyperlinks from the auto linker 21 with the run time media engine 25 the hyperlinked manuals are produced. The users benefit from the hyperlinked manuals and can quickly get access to related information by mouse clicking on the hotspot areas at which hyperlinks are associated. Many links can be automatically created from a single specification.

Figure 3:
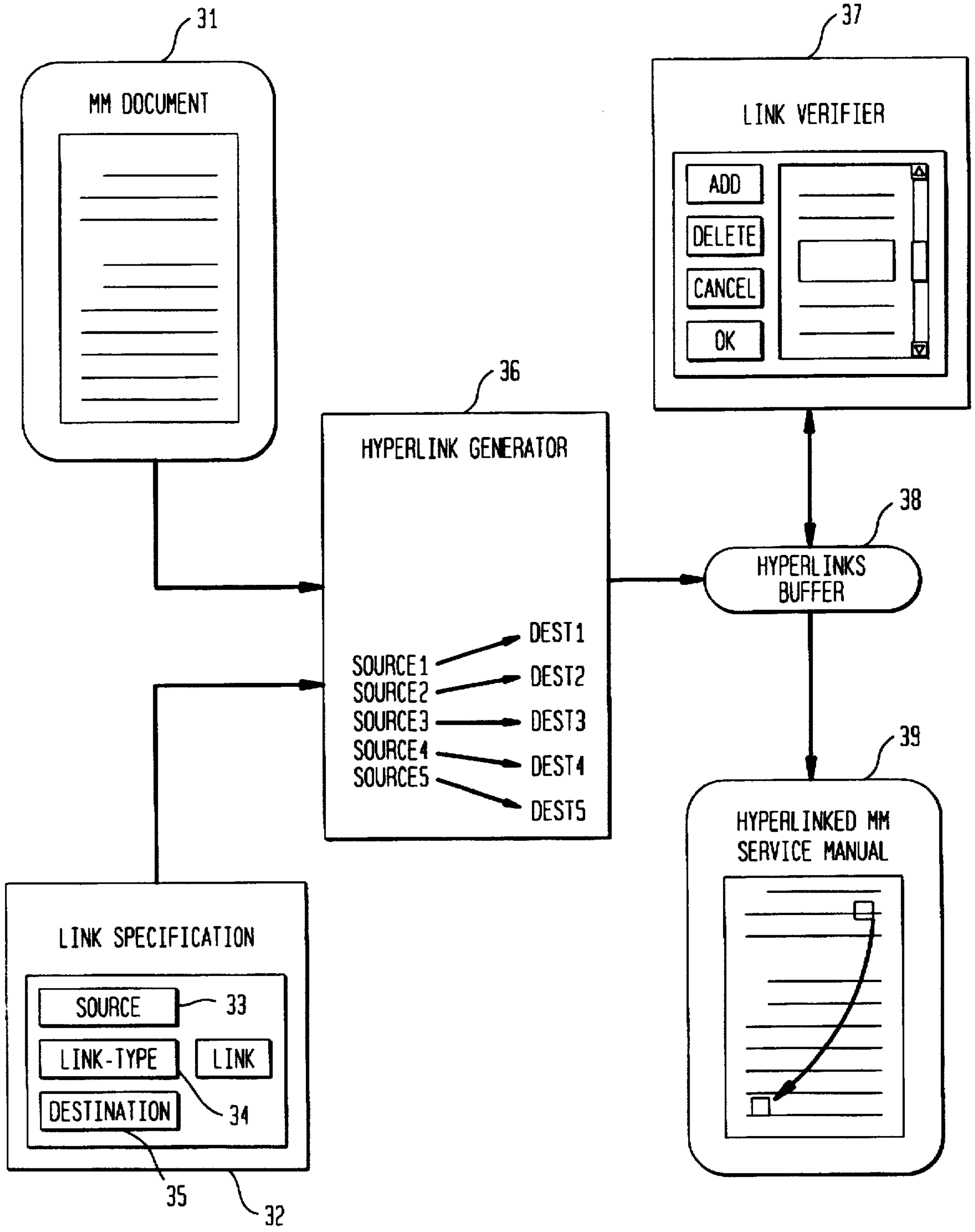
FIG. 3 illustrates information flow of the present invention.

FIG. 3 illustrates the information flow. The multimedia document 31 can be created by an authoring tool. Without an automatic hyperlinking tool, any needed hyperlinks must be added manually one at a time. The link specification 32, comprising the source 33, link type 34 and destination 35, provides a systematic way to automatically generate needed links. Source and destination patterns are used to describe needed links in a uniform manner for free text, structured text, graphics, etc . . . . For example, <Link "See Figure %x" to "Figure %x">. Both the multimedia document 31 and the link specification 32 are inputted to the hyperlink generator 36. The hyperlink generator 36 searches the service manuals and finds all of the links. The link verifier 37 provides facilities for verifying the links before they are inserted in the documents. Any undesired links can be deleted and new desired links can be added. The results can be recorded for later use. The hyperlink generator 36 with the link verifier 37 provide hyperlinks 38. The hyperlinked multimedia service manual 39 is created by inserting the verified links into the multimedia documents. The hyperlinked manual 39 can be viewed by using a manual browser.

The specification language including the language syntax will be described as follows. The hotspot and link specifications are defined as a set of tuples in the following form:

```
<LINK (link-type,name[,comments]) Source Destination
Include* Exclude*> where:
link-type:= REFER | CHAIN | OUTLINE | COMPUTE
Node:= (content-type, file-pointer, anchor-point)
Source:= Node
Destination:= Node | Destination+ | (Node Destination+)
Include:= (+ Source Destination)
Exclude:= (– Source Destination)
content-type:= TEXT/SGML | IMAGE/TIFF | GRAPHIC/CGM | . . .
anchor-point:=
    match-string/ context-tag
|   match-string// context-tag
|   computational scripts
/* '/' means match-string is directly contained within
the context-tag */
/* '//' means match-string is contained within the
context-tag */
match-string:= "SELF" | "content-string"
```

-continued

```
{regular-expression}
content-string: =
    strings allowable in TEXT/SGML
|   content-string defined for other content types by
<STRING . . . >
context-tag:=
    <ENTIRE>
|   (context-tag [D-]OUTSIDE match-string)
|   content-type-dependent-tag
|   content-type-dependent-context
|   (context-name = context-tag)
|   context-name
content-type-dependent-tag:=
    tags allowable in TEXT/SGML
|   tags defined for other content types by <TAG . . . >
content-type-dependent-context:=
    contexts-in-TEXT/SGML
|   contexts defined for other content types by <CONTEXT
. . . >
contexts-in-TEXT/SGML:=
    (context-tag WITH attribute-constraints)
|   (context-tag [D-]OUTSIDE context-tag)
|   (context-tag [D-]INSIDE context-tag)
|   (context-tag AFTER context-tag)
|   (context-tag BEFORE context-tag)
|   (context-tag AROUND context-tag
attribute-constraints:=
    attributename = NULL
|   attributename > attributevalue
|   attributename = attributevalue
|   attributename >= attributevalue
|   attributename < attributevalue
|   attributename <= attributevalue
|   attribute-constraints+
```

The link types, REFER, CHAIN, OUTLINE and COMPUTE are defined as follows. REFER cross references explicitly or implicitly refer to other information, and are the most common in service manuals. "See table", "refer to figure", "as shown in chapter", and "see section" are all examples of explicit cross references that are often found in service manuals. Other information pertaining to tools, materials, or procedures can be linked using REFER cross references.

The following is an example of hyperlinks from document numbers in a table-of-documents to documents.

```
<LINK (REFER, "Go to Starting Page", /* Access to
Documents from Table of Documents*/)
(TEXT/SGML, manual.doc, "%x"/ ((<ENTRY> WITH colname = "2")
INSIDE (<Table>OUTSIDE (<Title > OUTSIDE "Table of
Documents"))))
(TEXT/SGML, manual.doc, "SELF"/ (<DocHeader>
BEFORE(<DocNum> OUTSIDE "%x")))>
```

The language formally described above is used to specify enough information so that hyperlinks can be generated automatically. The example above specifies a REFER link which links entries in a Table-of-Documents to the starting point of the appropriate document. The variable, "%x" is used to match each source that is found with the appropriate destination. The context-tag which follows is used to narrow down the search and to help insure that the correct information is found. The destination specification uses the keyword SELF to specify that the context-tag is actually the destination.

CHAIN cross references consist of more than one cross reference. Usually, the intermediate reference is in a table. For instance, suppose it is desirable to link a component number with the appropriate part-list document for that component. Also suppose that the component numbers are listed in a table along with the part-list document number to refer to. A chain link is needed to go from the component number in the text to the component number in the table to the part-list document number in the table to the actual part-list document.

OUTLINE cross references arise from the structure of the service manuals. Users may need a brief overview of structural information such as a table of contents, list of figures, list of tables, list of citations, list of warnings, list of repair steps, list of help notes, etc . . . . Access to a table or figure could be gained by clicking on a title in the overview. Help information or emergency contact information such as names and phone numbers of on-call experts should be available at all times. Special hot-buttons or an overview menu can quickly access this information.

COMPUTE cross references are used to call external procedures which can compute the destination of a reference based on the context in which the manual is being used. For example, to retrieve some product information from a database, some routines could be called to access and query the database. This is important for database information that is changed frequently or for accessing the latest update information.

For the non-TEXT/SGML media, allowable strings, tags, and contexts need to be defined for each content-type. This specification mechanism uses strings to indicate the anchorable information units (AIUs) (or hotspot areas) for non-textual media. The strings can then be used for pattern matching against the match-string in the <LINK . . . > specification for identifying AIUs in non-textual media. This mechanism provides a method to uniformly specify anchor-points (i.e., match-string/context-tag or match-string// context-tag in <LINK . . . > specifications) for both textual and non-textual media.

String specification, a mechanism for describing contents of new media types, defines allowable string patterns which will eventually indicate Anchorable Information Units (AIUs) in a content-type media. A string-program shall be provided to generate AIUs from a given string in the pattern. For example, suppose we have a string-program that can identify an area of interest based on its relationship to some text in a CGM vector-based graphics file. This area can be a surrounding area of the text together with an area pointed to by a graphical arrow from the text. Then, the program and the following specification can be used:

<STRING "%x" GRAPHIC/CGM textual-area-of-interest> to specify a match-string that can indicate that area inside of a graphics file. If a wire trace program can be provided for schematic drawings, we can specify an allowable string pattern "%c/%p" (standing for AIUs of wire trace along any component c and its pin p). We can use:

<STRING "%c/%p" GRAPHIC/CGM wire-trace> to specify that a certain wire should be traced. This mechanism can incrementally add the capability of information access on non-textual media based on available identification programs to build AIUs for hyperlinks.

Suppose that both images and 3D CAD models for a particular complex piece of equipment exist. Further suppose there is a string-program (called visible-parts) that can overlay the 3D CAD models on the image and identify the visible parts in the image. Then, it is possible to associate an area on the image with its part name and specify a part in an image as an AIU by:

<STRING "%x" IMAGE/TIFF visible-parts> Tags, a mechanism for describing structure of contents of new media types, provide a way of labeling objects in a content-type media. For example, a <TITLE> tag in a text file indicates that the following text is in a title. The advantage of tags is that they can provide a structure for the content. Tag specification defines allowable tags for a content-type media. For content-type TEXT/SGML, the tags defined in an SGML DTD can be directly used in a <LINK . . . > specification because the containment relationships between the tags and the match-strings are clearly defined. If tags are to be used in other content-type media then the tags must be defined. The requirement is that a tag-program shall be provided to determine if a match-string is contained within a tag or directly contained within a tag (i.e., to provide interpretation of the notation "match-string/<tagname>" and "match-string//<tagname>" in the <LINK . . . > specifications for this content-type).

The following is an example of linking component related information.

```
<LINK (REFER, "Inspect Component")
(TEXT/SGML, manual.doc, "%x"/<COMP>)
(GRAPHIC/CGM, SurveyOfComponent.cgm, "%x"/<ENTIRE>)
(TEXT/SGML, manual.doc, "SELF"/ (<DocHeader>
BEFORE(<DocNum> OUTSIDE "3.6-%x-9423")))>
```

This example demonstrates the use of multiple destination points which need to be accessed simultaneously. The source is a Component number. It is known that Component numbers are tagged with <COMP> in the document. The first destination is an overview graphical diagram that contains the Component number. With the "textual-area-of-interest" string-program, that number and the related area can be highlighted to show the area of interest. The second destination is the Component document. In the specification of the second destination, the knowledge about document numbering schemes is taken advantage of.

Context, a mechanism for describing the relationships of the structures of new media types, provides a way to specify constraints and relationships among tags. For example, <TITLE Type="Figure"> INSIDE <CHAPTER> shows a constraint (Type="Figure") and a hierarchical relationship (<TITLE> within a <CHAPTER>). The contexts in content-type TEXT/SGML, such as Inside, Outside, After, Before, etc., are clearly defined. If contexts are to be used in other content-type media then the contexts must be defined. The requirement is that a context-program shall be provided to check the constraints of any legal tags. A context-tag program provides an interpretation of contexts on allowable tags in the <LINK . . . > specification.

Figure 4:
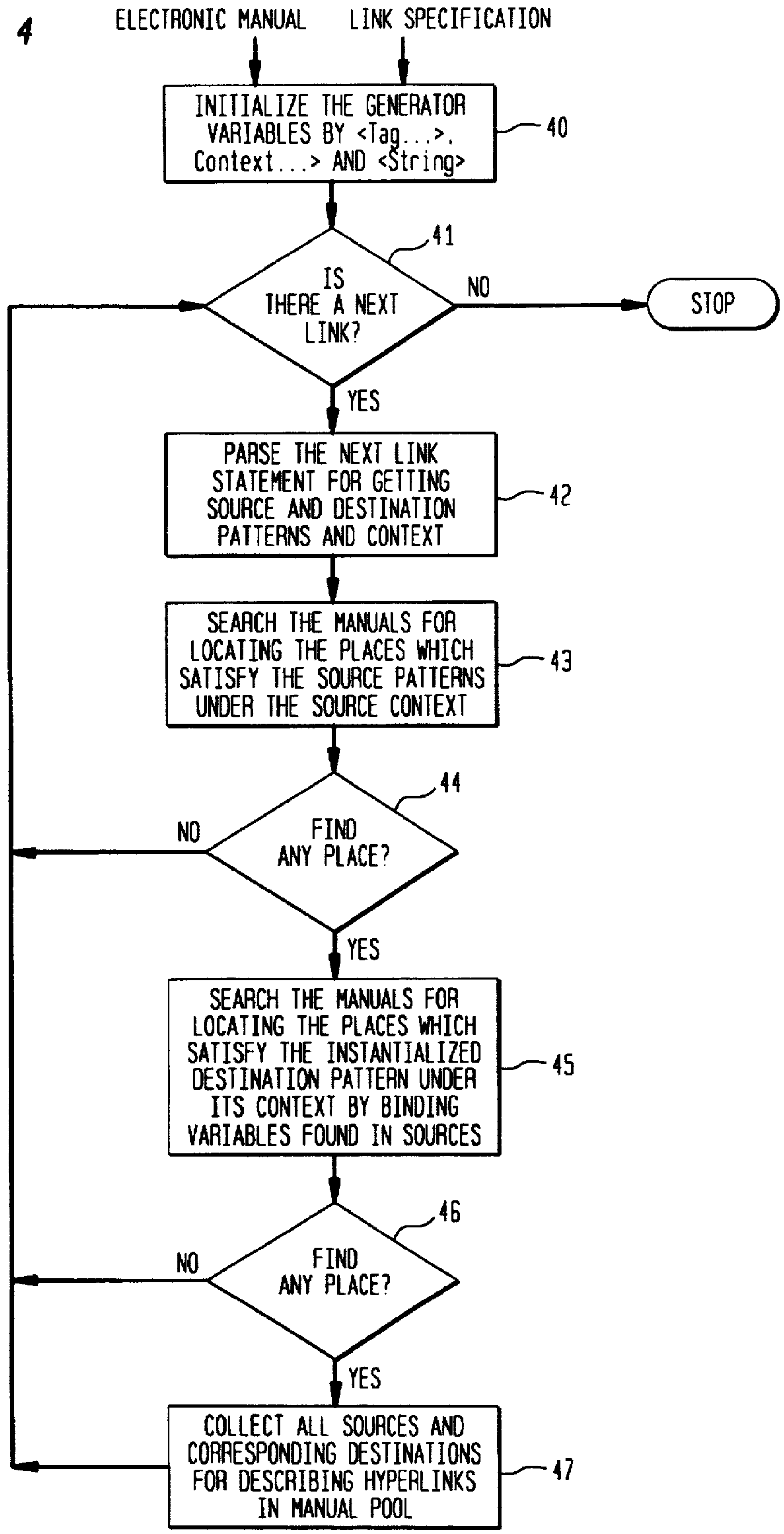
FIG. 4 illustrates a flowchart for the linker generator of the present invention.
Figure 5:
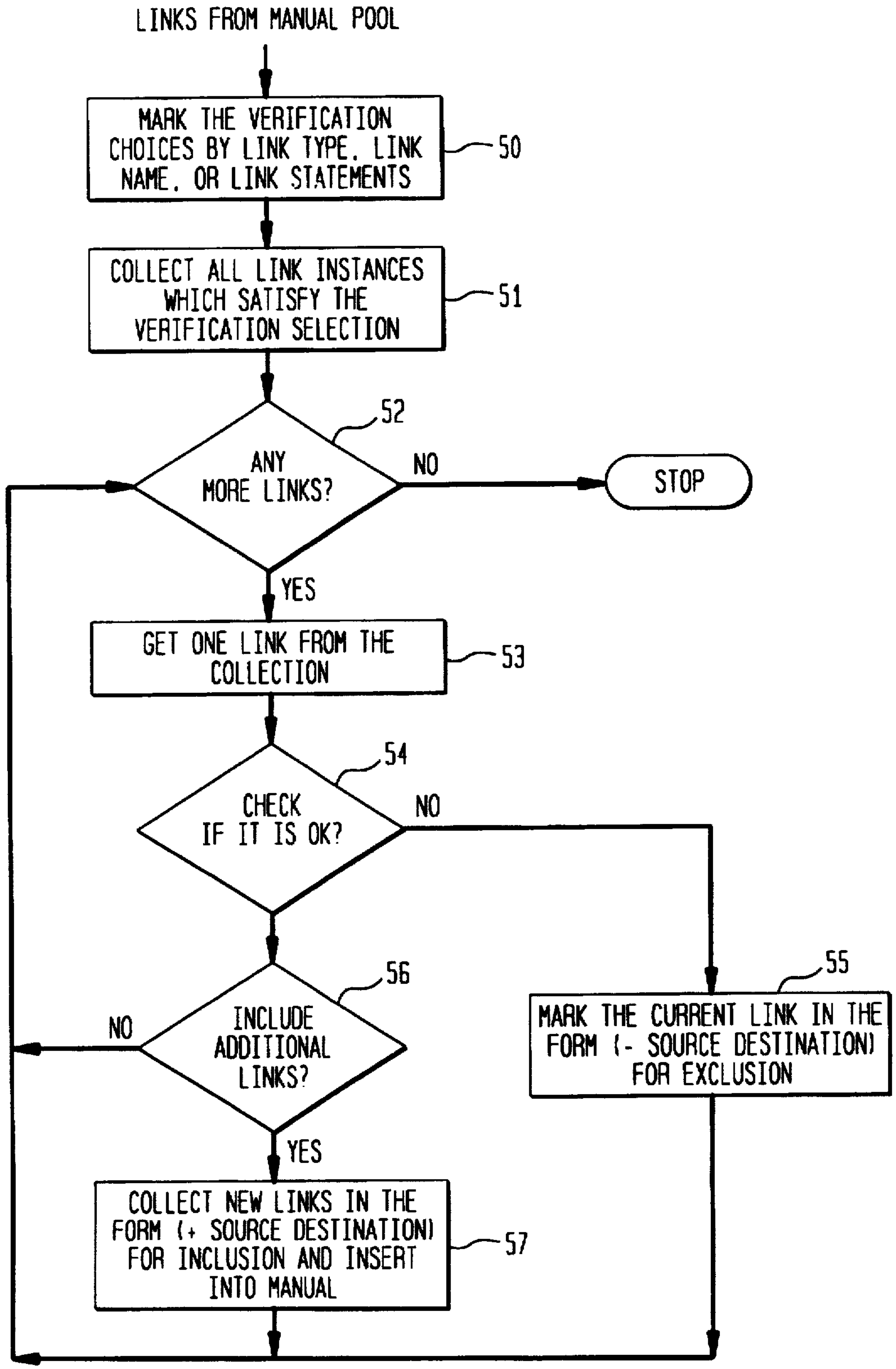
FIG. 5 illustrates the flow chart for the link verifier and insertion of the present invention.

The flow diagrams for evaluating the specification language to generate links and to verify the generated links are shown in FIGS. 4 and 5. In FIG. 4, the electronic mail and the link specification are inputted into box 40 where the generator variables are initialized. At decision block 41 a determination is made as to whether there is a next link. If there is not a next link the link generator stops. If there is a next link, the link statement is parsed in block 42, for getting the source and destination patterns and contexts. In block 43, the manuals are searched for locating the places which satisfy the source patterns under the source context. In decision block 44, if a place is not found, the flow returns to decision block 41. If a place is found, the manuals are then searched for locating the places which satisfy the instantialized destination pattern under its context by binding variables found in sources. This takes place in block 45. In decision block 46, if a place is not found, the flow once again returns to decision block 41. If a place is found, in block 47, there is a collection of all sources and corresponding destinations for describing hyperlinks in a Manual Pool.

FIG. 5 describes the flow chart for the link verifier and insertion. Links from the Manual Pool (FIG. 4) are inputted into block 50 where verification choices by link type, link name, or link statements are marked. All link instances which satisfy the verification selection are collected in block 51. At decision block 52 a determination is made as to whether there are any more links. If there are no more links, the link verification stops. If there are more links, in block 53, one link is obtained from the collection. A decision is then made in decision block 54 as to whether the link is OK. If the link is not OK, then in block 55, the current link is marked in the form (−source destination) for exclusion and the flow then returns to decision block 52 where a determination is made as to whether there are any more links. If the link is OK, then the link is inserted into a manual and a decision is made, in decision block 56, as to whether any additional links should be included. If no additional links should be included then the flow returns to decision block 52. If additional links should be included, then in block 57, new links in the form (+source destination) are collected for inclusion and inserted into the manual. The flow then returns to decision block 52 where a determination is made as to whether there are any more links.

Tags are defined by <!ELEMENT tag . . . > in SGML DTDs. For example, chapters, sections, tables and figures in SGMl documents are often associated with tags Chapter, Section, Table and Figure respectively. They generally could also have titles which are tagged with "chapter title", "section title", "table title" and "figure title" tags respectively. However, tags for non-textual information are not defined in SGML documents. The present invention will take advantage of the tagging mechanisms provided by the file format or publishing system in order to locate hotspots (sources) and destinations in service manuals. Tags can be used to help specify, search for, and locate service manual contents in different contexts such as tables, headers, figures, etc. If no tagging mechanisms are provided, some specifications must be written for "user-defined" tags to get context information from the contents. Suppose the entire service manual is stored in plain ASCII text. Then it will be necessary to write some code to analyze the text and extract some context information. For instance, a string of numbers separated by periods followed by a string of all capital letters probably indicates a heading or subheading so that the text can be tagged with a heading or subheading tag. Tags are also used in graphics to identify a group of related objects. For example, a group of line segments could be associated with a "house" tag.

The present invention includes two important features. The link specification described by the specification language compiled by the link generator can UNIFORMLY describe the needed hyperlinks on different content-type media for required information access and the system can systematically generate the hyperlinks once the needed hyperlinks are adequately specified. The mechanism to INCREMENTALLY specify Anchorable Information Units (AIUs) on non-textual media using <STRING . . . >, <TAG . . . >, and <CONTEXT . . . > is particularly useful because there is no general solution to identifying objects in non-textual media, and thus there are no standard ways to represent AIUs for non-textual media. Without recoding the link generator, the present invention provides a solution to specify/generate AIUs on a variety of media and formats in an extensive manner based on the best identification programs that are available. Currently in the prior art, hyperlinks are created manually or in a restrictive manner on texts.

It is not intended that the present invention be limited to the software arrangement, or operational procedures shown disclosed. This invention includes all of the alterations and variations thereto as encompassed within the scope of the claims as follows.

Examples of Link Specifications follows:

```
<STRING "%x" GRAPHIC/CGM textual-area-of-interests)
<LINK (REFER, "See Figures", /* See Related Figures */)
(TEXT/SGML, manual.doc, "see figure %x"//<ManualSet>)
(TEXT/SGML, manual.doc, "SELF" / (<Figure> OUTSIDE
(<Title> OUTSIDE "figure %x")))>
<LINK (REFER, "See Tables", /* See Related Tables*/)
(TEXT/SGML, manual.doc, "see figure %x"//<ManualSet>)
(TEXT/SGML, manual.doc, "SELF" / (<Table>OUTSTDE
(<Title>OUTSIDE "table %x")))>
<LINK (REFER, "See Reference Docs", /* Access to Related
Docs for Repair Instructions and Scheds */)
(TEXT/SGML, manual.doc, "%x"/((<ENTRY>WITH colname ="1")
INSIDE (<Table>OUTSIDE (<Title > OUTSIDE"Reference
Docs")))
(TEXT/SGML, manual.doc, "SELF" / (<DocHeader>
BEFORE(<DocNum>OUTSIDE "%x"))>
<LINK (CHAIN, "Find Drawing Documents", /* Check Drawings
from Component Numbers */)
(TEXT/SGML, manual.doc, "%x"/<COMP>)
(TEXT/SGML,manual.doc, "%x"/ ((<ENTRY> WITH colname ="3")
INSIDE (rowname = (<ROW>INSIDE <ComponentSurvey>)))
(TEXT/SGML, manual.doc, "%y"/(<ENTRY> WITH colname = "4")
INSIDE rowname))
(TEXT/SGML, manual.doc, "SELF"/ (<DocHeader>
BEFORE(<DocNum> OUTSIDE "%y")))>
<LINK (CHAIN, "Find Part List Documents", / * Check Part
List Docs from Component Numbers */)
(TEXT/SGML, manual.doc, "%x"/<COMP>)
(TEXT/SGML, manual.doc, "%x"/ ((<ENTRY> WITH colname =
"3") INSIDE (rowname = (<ROW>INSIDE <ComponentSurvey>)))
(TEXT/SGML, manual.doc, "%y"/((<ENTRY> WITH colname ="5")
INSIDE rowname))
(TEXT/SGML, manual.doc, "SELF" / (<DocHeader>
BEFORE(<DocNum> OUTSIDE "%y")))>
<LINK (OUTLINE "Repair Schedules Outlines", /* Overview
Repair Instructions and Schedules*/)
(SYSTEM/VIEW, TOC , "Repair Inst&Schedu"/<menu-item>)
(TEXT/SGML, manual.doc, "SELF"/(<Title>INSIDE
(<InstHeader> INSIDE <RepairInst>)))
(TEXT/SGML, manual.doc, "SELF"/(<Title>INSIDE
(<SchedHeader> INSIDE <RepairSched>)))>
<LINK (OUTLINE "List of Phone Help", /* Qverview All Help
Phone Numbers*/)
(SYSTEM/VIEW, TOC, "Phone Help"/<menu-item>)
(TEXT/SGML, manual.doc, "Telephon %x"//<ManualSet>)>
<LINK (OUTLINE "List of Figures", /* Overview All
Figures*/)
(SYSTEM/VIEW, TOC, "Figure Overview"/<menu-item>)
(TEXT/SGML, manual.doc, "SELF"/(<Title>INSIDE
<Figure>))>
<LINK (OUTLINE "List of Tables", /* Overview All
Tables*/)
(SYSTEM/VIEW, TOC , "Table Overview"/<menu-item>)
(TEXT/SGML, manual.doc, "SELF"/(<Title> INSIDE <Table>))>
```

We claim:

1. A system for automatic hyperlinking on multimedia by compiling link specifications comprising:

an extensible Anchorable Information Units (AIU) representation for describing multimedia content;

a link specification based on said extensible AIU representation;

an auto linker for receiving said link specification and a multimedia manual and for providing hyperlinks; and, a run-time media engine connected to said hyperlinks; wherein said auto linker comprises:

a link generator for providing said hyperlinks;

a link verifier for checking and modifying said hyperlinks; and, a hyperlink buffer for correlating said link generator with said link verifier wherein;

said link generator incrementally and automatically generates said hyperlinks among textual and non-textual media based on said extensible AIU representation.

2. A system for automatic hyperlinking on multimedia by compiling link specifications as claimed in claim 1 wherein;

said link specification, described by specification language and based on said extensible AIU representation compiled by said link generator, uniformly describes needed hyperlinks on different content-type media for required information access and said link generator systematically generates said hyperlinks.

3. A system for automatic hyperlinking on multimedia by compiling link specifications as claimed in claim 1 wherein:

said link specification specifies extensible anchorable information units on non-textual media by using <STRING . . . >, a mechanism for describing contents of new media types, <TAG . . . >, a mechanism for describing structures of said contents, and <CONTEXT . . . > a mechanism for describing relationships of said structures.

4. A method for automatic hyperlinking on multimedia by compiling link specifications comprising the steps of:

receiving a link specification based on an Anchorable Information Units (AIU) representation;

receiving a multimedia manual;

generating hyperlinks;

verifying said links;

utilizing a run-time media engine to include user interaction; and, inserting said hyperlinks into said manual to provide a hyperlinked manual wherein generating hyperlinks comprises the step of:

automatically generating said hyperlinks among textual and non-textual media.

5. A method for automatic hyperlinking on multimedia by compiling link specifications as claimed in claim 4 wherein generating hyperlinks further comprises the steps of:

uniformly describing needed hyperlinks;

compiling specification language obtained from said link specification; and systematically generating said hyperlinks.

6. A method for automatic hyperlinking on multimedia by compiling link specifications as claimed in claim 5 wherein generating links further comprises the step of:

specifying extensible anchorable information units on non-textual media automatically by using <STRING . . . >, a mechanism for describing contents of new media types, <TAG . . . >, a mechanism for describing structures of said contents, and <CONTEXT . . . > a mechanism for describing relationships of said structures and without recoding link generator.

7. A method for automatic hyperlinking on multimedia by compiling link specifications as claimed in claim 4 wherein generating links comprises the steps of:

initializing generator variables;

deciding whether there is a next link;

parsing next link statement for getting source patterns, destination patterns, source contexts and destination contests;

searching said manual for locating places which satisfy said source patterns under said source context;

searching said manual for locating places which satisfy instantialized destination pattern under context of initialized destination pattern by binding variables found in sources; and, collecting all sources and corresponding destinations for describing hyperlinks.

8. A method for automatic hyperlinking on multimedia by compiling link specifications as claimed in claim 4 wherein verifying said links comprises the steps of:

examining said links;

performing a results check;

dropping said links if required;

revising said links if required; and, forwarding said links for insertion.

9. A method for automatic hyperlinking on multimedia by compiling link specifications as claimed in claim 4 wherein verifying said links comprises the steps of:

inputting said links from a manual pool;

marking the verification choices by link type, link name or link statements;

collecting all link instances which satisfy verification selection;

deciding if there are any more links;

taking one link;

checking if said link is correct, wherein if said link is not correct, mark said link for exclusion;

deciding whether to include additional links;

collecting new links for inclusion; and, inserting said new links into said manual.

10. A system for automatic hyperlinking on multimedia by compiling link specifications comprising:

an extensible Anchorable Information Units (AIU) representation;

a link specification based on said extensible AIU representation;

an auto linker for receiving said link specification and a multimedia manual and for providing hyperlinks; and, a run time media engine means connected to said hyperlinks; wherein said run-time media engine means comprises:

event handler means; and, script interpreter means.

* * * * *